United States Patent Office 3,522,734
Patented Aug. 4, 1970

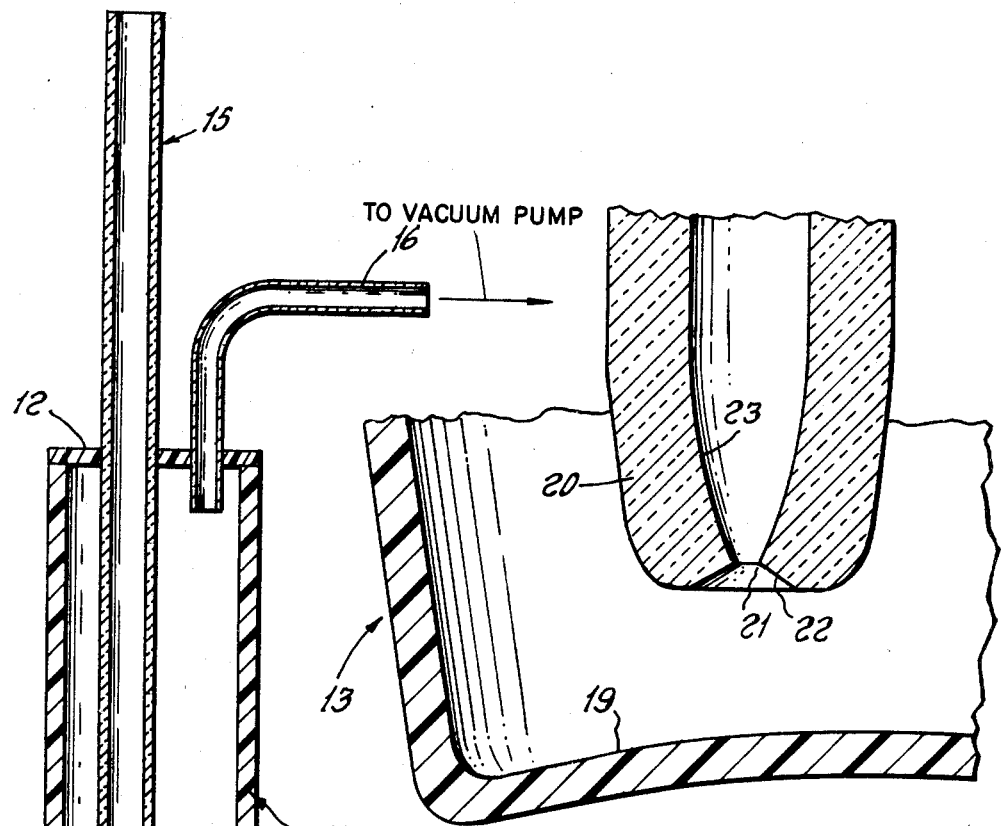
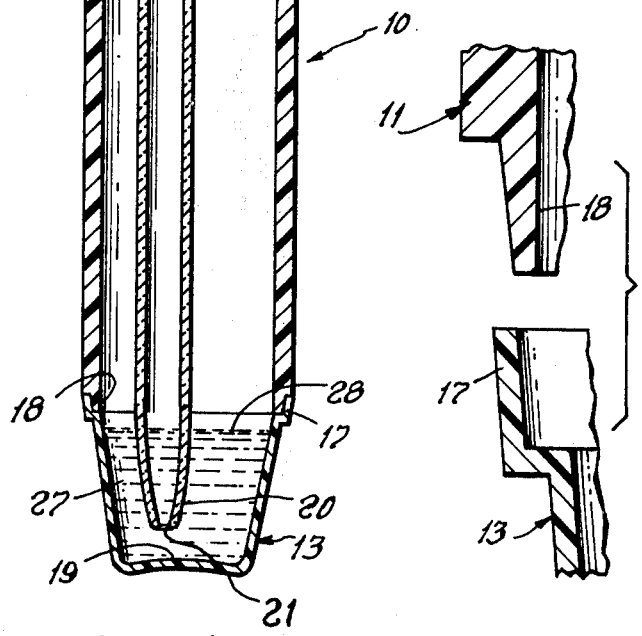

3,522,734
PARTICLE CAPTURE DEVICE
William A. Curby, West Newton, Mass., assignor, by mesne assignments, to the United States of America as represented by the Secretary of the Navy
Filed Nov. 21, 1968, Ser. No. 777,814
Int. Cl. G01n 1/02
U.S. Cl. 73—421                                       11 Claims

ABSTRACT OF THE DISCLOSURE

A device for capturing minute particles by drawing ambient air which contains the particles through an orifice small enough to cause the velocity of the air leaving the orifice to exceed sonic velocity. The orifice is knife-edged to reduce turbulence yet complete expansion within the site of the input tube. Flow is induced by a selected negative pressure above the orifice of about one-half atmosphere. Selected dimensions of the vacuum flask, the intake tube and the impinging fluid container and the distance from the orifice to the bottom of the container effectively confine particles within the agitated fluid during sampling.

---

The invention described herein may be manufactured and used by or for the Government of the United States of America for governmental purposes without the payment of any royalties thereon or therefor.

The present invention concerns particle capture devices and, more particularly, a device adapted to receive captured particles in a fluid and to retain the particles in the fluid substantially unaltered and undamaged while airflow therethrough is maintained at sonic flow rates.

Impingers are devices which operate on the principle of fluid impaction and are used to separate and retain particulate material from a stream of air passed through them. They have been in use since about 1922 but with flow rates and aperture diameters which are not adapted for biological sampling. The prior units also have been difficult to clean, costly and bulky, and have required that the sampling fluids be transferred over contaminated surfaces or that pipettes be introduced into the sample. In addition to being directional, the previous devices have been inadequately designed for taking samples under extreme conditions such as are encountered on board ship during inclement or stormy weather.

An impinger or air sampling device, to be effective in capturing biological material, should not alter the viability or state of health of the organisms captured. The device should also be sterile so that it does not add foreign organisms to the sample collected or cause carryover of organisms from one fluid sample to another. Further, it is desirable that the sampling device take several samples consecutively with a minium delay between each sampling period. Such a device also must be devoid of variations in construction which would cause delay in changing from one sample to another.

The particle capture device of the present invention avoids the deficiencies of prior devices by providing a biologically inert receptacle to which may be easily but securely connected successively any desired number of flexible containers. The device draws ambient air through an orifice small enough to cause the velocity of the air leaving this aperture to exceed sonic velocity, without significantly affecting the viability of captured biological particles. The entire device is compact, inexpensive and operable under substantially all conditions which may be encountered on a vessel at sea.

Accordingly, it is an object of the present invention to provide a particle capture device which is simple in construction, compact in size, operable at greater than sonic flow rates, and may be used under substantially all conditions which may be met on a vessel at sea.

Another object of the present invention is to provide a particle capture device wherein airborne, viable and non-viable particles may be captured without significant alteration of the biological sample and without significant contamination from the particle capturing device.

A further object of the present invention is to provide a particle capture device that operates at a constant flow velocity which will maintain constant flow rates despite appreciable changes in pressure and in air flow conditions directly over the input tube of the device.

Other objects, advantages and novel features of the invention will become apparent from the following detailed description thereof when considered in conjunction with the accompanying drawings in which like numerals represent like parts throughout and wherein FIG. 1 is a sectional view of one embodiment of the invention;

FIG. 2 is an enlarged sectional view of the orifice and the receiving container of the embodiment of FIG. 1; and FIG. 3 is an enlarged sectional view of the mating surfaces of two components of the embodiment of FIG. 1.

Referring now to FIG. 1, there is shown a particle capture device 10 having a chamber such as is provided by cylinder or flask 11 which is sealed by a cap 12 at the input end and closed by a removable receptacle such as container 13 at the opposite end. Cap 12 is adapted to receive in sealed relationship an input tube 15 and a pressure supply tube 16 to which a negative pressure source, not shown, is connected. Container 13 is of flexible material and may be made of a plastic such as polypropylene, the container having an upper rim 17 which is adapted to fit in close relationship over a tapered edge 18 of flask 11. Flask 11 and cap 12 also are of plastic material and are secured together at the upper end of flask 11 preferably by bonding thereto. Input tube 15 preferably is made of glass while pressure tube 16 may be either glass or plastic. Both tubes 15 and 16 are sealed in cap 12 by appropriate sealing material.

The volume of flask 11 and the diameter and length of input tube 15 are closely related because, among other reasons, of the above sonic flow rate achieved and the desire to avoid vaporization of fluid in the flask and loss of or damage to the entrained particles. A length to diameter ratio of flask 11 of substantially four-to-one also has been found to assist in avoiding vaporization and capturing entrained particles. The top of input tube 15 should be precisely planar and should have sharp edges, i.e., not be fire polished, so as to cause the least amount of turbulence in the air flowing over it. Such a construction promotes the entrance of a variety of sizes of particles into the tube, whereas imperfections in the opening could cause the larger particles to be carried beyond the opening, resulting in an inaccurate sample. The length and orifice diameter of tube 15 are adapted to provide an above sonic flow rate at the discharge side of the orifice while the flow rate immediately inside is substantially one-half of the sonic flow rate.

The input tube 15, to be effective, must provide a straight path from the atmosphere from which samples are to be taken to a point a selected distance above the adjacent bottom surface 19 of container 13. Input tube 15, also to promote desired diffusion of air and particles at its exit end 20, is provided with a knife-edged orifice 21 which may be formed by first heating the lower end of the tube until it is plastic and the walls thereof thicken inwardly to a diameter less than the desired final orifice diameter. After such thickening has been obtained and the glass has hardened, the tube is ground by a suitable tool, such as a conically shaped grinding wheel, to provide, as shown in FIG. 2, a flat conical surface 22 whose inner edge terminates at the knife-edge indicated at 21. The upper surface of knife-edged orifice 21, namely surface 23, is concave due to the curvature of the glass induced by heating and, thus, requires no shaping. Through the method described, a true knife edge is obtained which is effective in avoiding a ballistic effect at the orifice such as occurs where tubes having orifices with substantially uniform inner surfaces are used. A preferred ratio between the diameter of orifice 21 and the distance of the orifice from the adjacent surface 19 of container 13 in the range of from 5 to 8 has been found to promote particularly effective particle capture.

FIG. 2 also illustrates the desired spatial relation of the diameter of the orifice from which air and particles flow at sonic velocity and the surface 19 of container 13. An orifice diameter of one millimeter coupled with a spacing from orifice 21 to surface 19 of seven millimeters has been found to provide satisfactory diffusion at the sonic rate of flow. Surface 19 should be convex, as shown, in order both that the approaching air and particles may be even more effectively diffused in the container and to distribute sampling fluid more effectively over the base of the container. Although in FIG. 1 tube 15 is shown offset from the axis of flask 11, it will be appreciated that the tube may be axially positioned in flask 11 within the inventive concept. FIG. 3 illustrates by enlarged sections the manner in which tip 18 of flask 11 and rim 17 of container 13 are formed to provide a firm, sealing yet easily released closure.

The device, in addition, requires the use of a standard laboratory pump capable of providing an operating negative pressure on the order of from one-half to one atmosphere. Such a pump should have a maximum capability in this range in order to avoid fluctuations in pressure during sample collection. The negative pressure supply must be sufficiently high to create sonic velocities even though ambient air passing over the top of tube 15 is moving at velocities on the order of forty to sixty knots.

In operation, an impinging fluid 27 is introduced into container 13 to a selected level such as is indicated at 28 in FIG. 1 and, thereafter, the container is secured in position about the lower end of tube 15 by press fit between rim 17 and tapered edge 18. With the open end of pressure tube 16 attached to the standard laboratory pump and a selected negative pressure established, the desired flow rate will be produced at orifice 21 provided the orifice is sufficiently small in diameter. An orifice diameter of one millimeter and a selected negative pressure above the orifice of minus one-half atmosphere have resulted in efficient operation, while reducing vaporization of the impinging fluid 27 to a minimum.

Orifice 21 is knife-edged to also insure that turbulence of the air through the aperture is reduced to a minimum yet expansion of the air beyond the aperture is complete within the site of the input tube. Both of these factors serve to keep the aperture site cool as well as reducing the possibility of cavitation.

A diameter of input tube 15 of three-eighths of an inch has been determined to be optimum since it is large enough to allow high efficiency passage of small particles yet narrow enough to obviate the possibility of standing wave formations or resonance compression even in shifts of wind velocity as great as forty knots. The length of input tube 15, substantially thirteen and one-half inches, has been found to be sufficient to avoid the air flow over the top of the tube from contributing to a back pressure in the input air column.

Desired dimensions of flask 11 are an inside diameter of one and three-fourths inches and a length of eight inches. These dimensions, coupled with those of container 13 and the volume of liquid therein, effectively confine particles within the agitated fluid during sampling. Those particles which may escape from the fluid should collect on the walls of the flask, being thus precluded from escape through tube 16. The convex bottom 19 of container 13 also serves to prevent particle accumulation on the base by impaction. A particle-free, tight-fitting cap for container 13, not shown, should be provided so that the container can be filled prior to use and then recapped immediately after a sampling has been completed.

Optimum results in operation of the device have been achieved by use of negative pressure within that which can be supplied by standard laboratory vacuum pumps, by the size of aperture that will cause air flow to become sonic or above sonic when drawn by such a pump, and by a value of negative pressure which is sufficiently low to preclude boiling off of the fluid in flask 11. Where a limit of minus three-quarters of an atmosphere negative pressure is set, the device can pass up to approximately fifteen liters of air per minute under wind velocities of up to forty knots. Sub-sonic velocities are to be avoided since these velocities result in low capture efficiency of particles of interest, i.e., $.1\mu$ to $20\mu$ diameter. Trans-sonic velocities also are to be avoided since those velocities cause turbulence that can affect the viability of entrained biological material.

There has thus been provided a device which makes possible simplified, inexpensive, accurate and noncontaminated sample collection in the field without the need for refrigeration of the containers prior to sampling. Samples may be stored until analyzed without the need to transfer to a particle-free, sterile bottle. Several prepackaged sampling fluids may be selected, thereby increasing the capabilities of matching special requirements while in the field. The form of aperture promotes diffusion of particles into the impinging fluid, avoiding impaction on the container and greatly reducing the possibility of damage to viable microorganisms at the sonic velocities which they have attained.

It will be recognized that many modifications and variations of the present invention are possible in the light of the above teachings. It is therefore to be understood that the invention may be practiced otherwise than as specifically described.

What is claimed is:

1. A device for entrapping in substantially unaltered form airborne viable and nonviable particles moving at sonic velocities, comprising
   a cylinder of biologically inert material sealed at one end and open at the opposite end;
   elongate air and particle intake means traversing said sealed end and including a discharge diffusing orifice of substantially smaller diameter than the diameter of said intake means disposed outside of said open end of said cylinder,
      said intake means having an inlet end disposed opposite to and remote from the sealed end of said cylinder;
      said intake means providing a direct flow passage and having a diameter substantially smaller than the diameter of said cylinder to entrain small particles and avoid flow perturbations;
   a source of vacuum and means connected thereto communicating with the interior of said cylinder remote from said open end to induce flow through said intake means;
   a removable receptacle enclosing said open end; and
   a fluid in said receptacle for collecting viable and nonviable particles entrained in the air flow, whereby a selected negative pressure at said source of vacuum will induce subsonic flow into said orifice and sonic or trans-sonic diffused flow into said fluid.

2. The device of claim 1 wherein the inlet end of said intake means is planar and transverse to the longitudinal axis thereof to avoid creating turbulence in the air flowing across it.

3. A device for entrapping in substantially unaltered form airborne viable and nonviable particles moving at sonic velocities comprising a cylinder of biologically inert material sealed at one end and open at the opposite end;

elongate air and particle intake means traversing said sealed end and including a discharge diffusing orifice disposed outside of said open end of said cylinder, said orifice being knife-edged to promote diffusion of air and particulate matter therein in said fluid;

said intake means providing a direct flow passage and having a diameter adapted to entrain small particles and avoid flow perturbations;

a source of vacuum and means connected thereto communicating with the interior of said cylinder remote from said open end to induce flow through said intake means;

a removable receptacle enclosing said open end; and a fluid in said receptacle for collecting viable and nonviable particles entrained in the air flow, whereby a selected negative pressure at said source of vacuum will induce subsonic flow into said orifice and sonic or trans-sonic diffused flow into said fluid.

4. A device for entrapping in substantially unaltered form airborne viable and nonviable particles moving at sonic velocities comprising:

a cylinder of biologically inert material sealed at one end and open at the opposite end;

elongate air and particle intake means traversing said sealed end and including a discharge diffusing orifice disposed outside of said open end of said cylinder, said intake means having an inlet end disposed opposite to and remote from the sealed end of said cylinder, said intake means providing a direct flow passage and having a diameter adapted to entrain small particles and avoid flow perturbations;

a source of vacuum and means connected thereto communicating with the interior of said cylinder remote from said open end to induce flow through said intake means;

a removable receptacle enclosing said open end; and a fluid in said receptacle for collecting viable and nonviable particles entrained in the air flow, said inlet end of said intake means planar and transverse to the longitudinal axis thereof to avoid creating turbulence in the air flowing across it, said orifice knife-edged to promote diffusion of air and particulate matter therein in said fluid, whereby a selected negative pressure at said source of vacuum will induce subsonic flow into said orifice and sonic or trans-sonic diffused flow into said fluid.

5. The device of claim 4 wherein the ratio of the diameter of said orifice to the distance from said orifice to the adjacent surface of said receptacle is in the range of from five to eight.

6. The device of claim 5 wherein the diameter of said orifice is on the order of one millimeter.

7. The device of claim 6 wherein said receptacle is provided with a convex bottom surface to promote diffusion of air and particles and avoid impaction of particles on said bottom surface.

8. The device of claim 7 wherein the length to diameter ratio of said cylinder is substantially four-to-one to confine particles within said fluid and said cylinder during sampling.

9. The device of claim 8 wherein said means connected to said source of vacuum is a vacuum tube which traverses and is sealed to said sealed end of said cylinder.

10. The method of obtaining samples of the particulate matter in ambient air, comprising:

inducing entry of ambient air into an elongate tube;

discharging said air into an impinging fluid;

diffusing said air into said fluid at substantially sonic velocity by forming a knife-edged orifice at the exit end of said tube; and disposing a receptacle opposite said orifice so that the ratio of the distance from the orifice to the bottom surface of the receptacle to the diameter of the orifice is in the range of 5 to 8 so as to promote diffusion and avoid impaction of particles on the bottom surface of the receptacle.

11. The method of claim 10 wherein the knife edge of said orifice is formed by reducing the inner diameter at the exit end of the tube through softening of the tube material so as to form a concave inner surface;

hardening the softened material; and shaping the end of the tube adjacent said concave inner surface into a flat surface so that a circular knife edge is formed having at least one concave surface and one flat surface.

References Cited

UNITED STATES PATENTS

| | | | |
|---|---|---|---|
| 2,585,314 | 2/1952 | Hazeltine et al. | 73—421 XR |
| 2,703,015 | 3/1955 | Sykes | 73—422 |
| 3,001,402 | 9/1961 | Koblin | 73—421.5 |

S. CLEMENT SWISHER, Primary Examiner

H. C. POST III, Assistant Examiner

U.S. Cl. X.R.

73—421.5